Oct. 23, 1956  E. W. POTTMEYER  2,767,738
VALVE ASSEMBLY FOR METALLURGICAL FURNACES OR THE LIKE
Filed Dec. 27, 1950  2 Sheets-Sheet 1
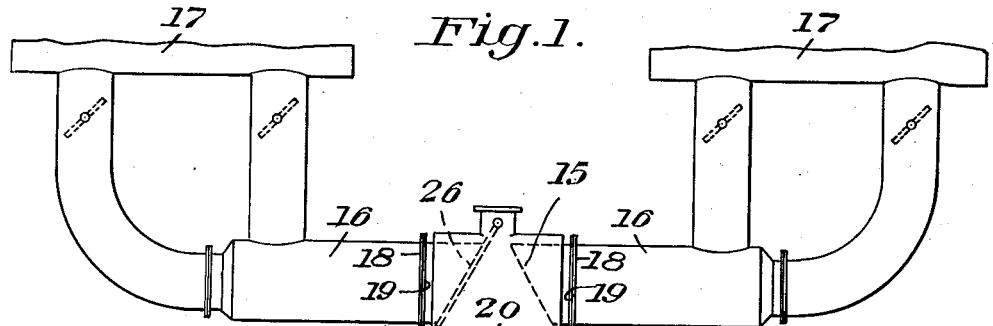
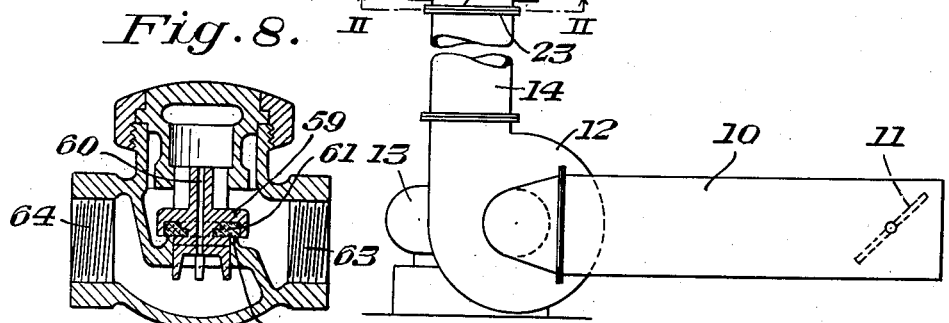
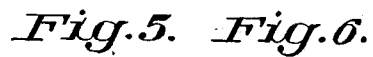
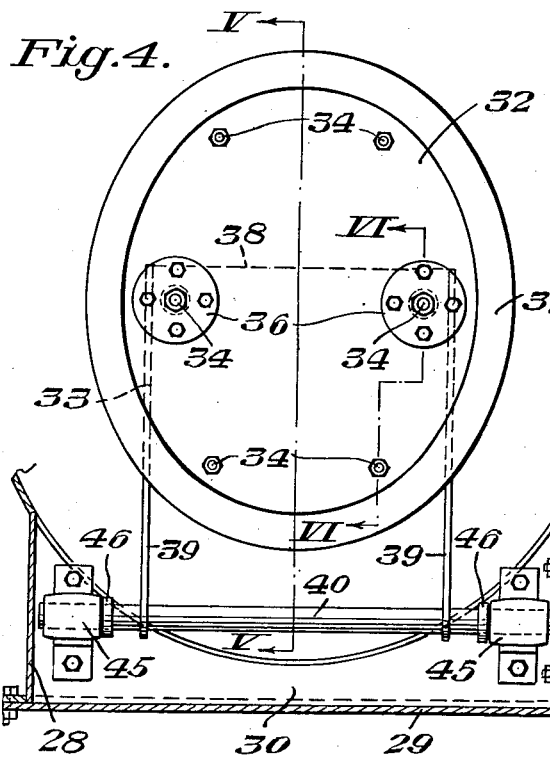
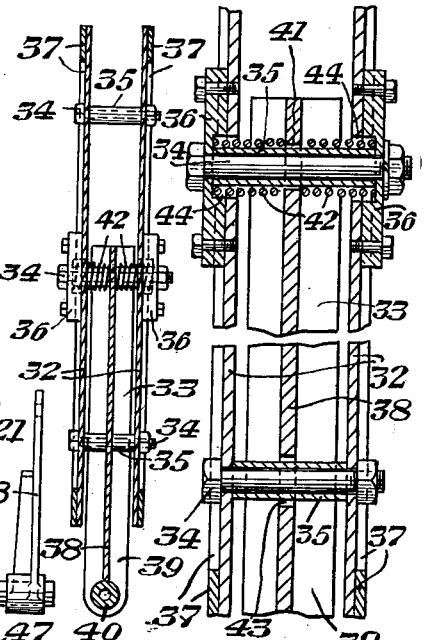
INVENTOR
Edward W. Pottmeyer
by Hooper, * & *
his attorneys

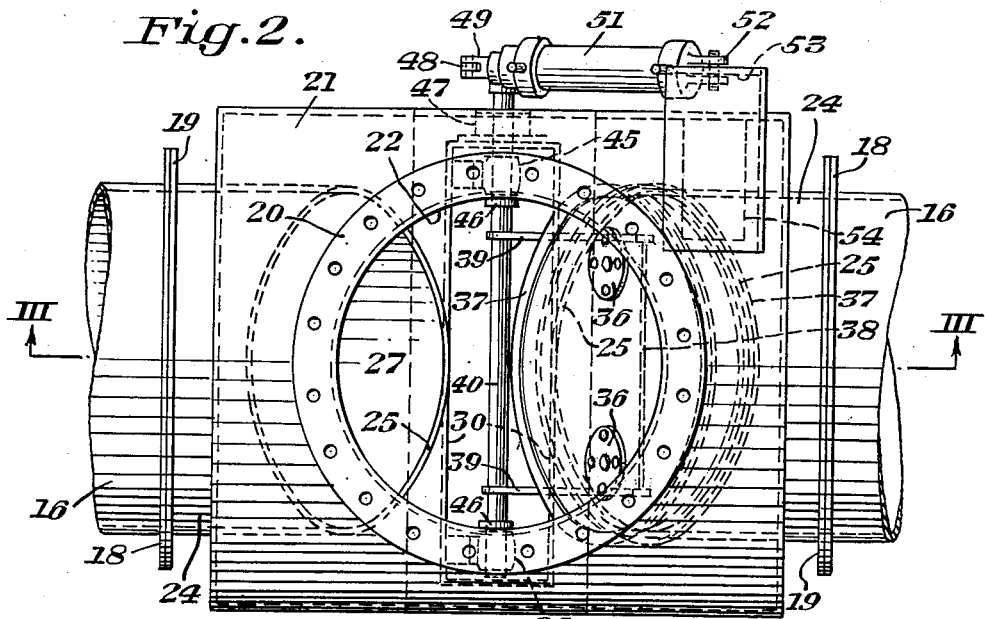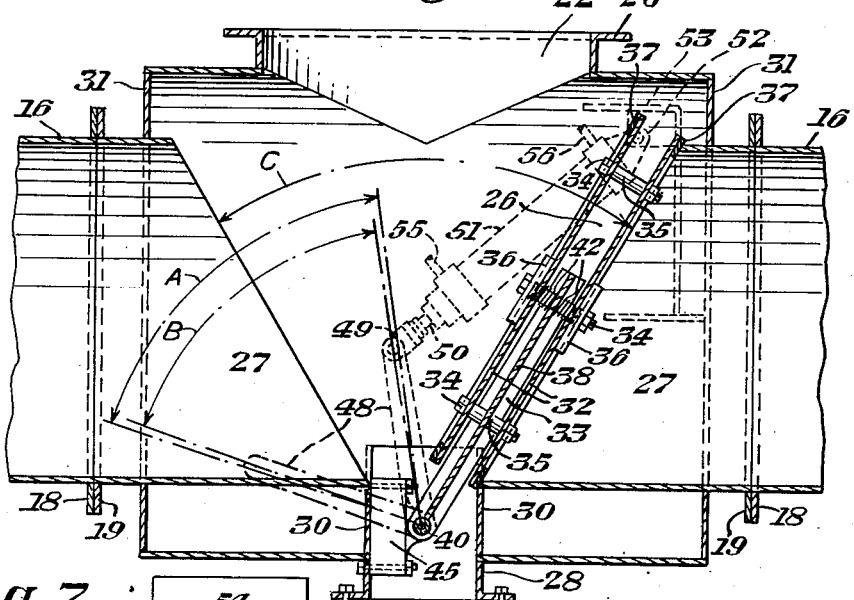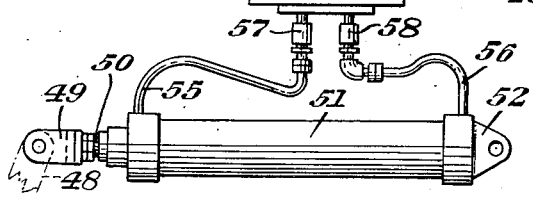

United States Patent Office 2,767,738
Patented Oct. 23, 1956

2,767,738

VALVE ASSEMBLY FOR METALLURGICAL FURNACES OR THE LIKE

Edward William Pottmeyer, Pittsburgh, Pa., assignor, by mesne assignments, to Blaw-Knox Company, Pittsburgh, Pa., a corporation of Delaware Application December 27, 1950, Serial No. 202,846

4 Claims. (Cl. 137—625.44)

This invention relates to a self-adjusting valve assembly for metallurgical furnaces or the like. More particularly, it relates to a novel flap-type valve which may be used advantageously, for example, in reversing furnaces for the automatic alternating admission of air thereto.

Open-hearth furnaces for making steel and like furnaces are of a reversing type. That is to say, the flow of air and waste gases through the furnace is alternately or periodically reversed. Moreover, it is common in such furnaces to provide a single inlet for the air and a valve is used to reverse its flow to the furnace. Similarly, waste gases are valve controlled to direct them through their alternating paths to the furnace stack. Because of the great volumes of air and waste gases handled in the operation of such furnaces, these valves are very large and the peripheral length of the seat which must be engaged and sealed is considerable. This means the fitting of the valve closure against the valve seat is critical and must be tight.

One form of valve assembly used for reversing such gas flows was the flap type. In the case of such valves it was common to provide an extensive housing. In addition, such flap-type or pivotal valve assemblies had to be installed with extreme care and even in such cases a slight misalignment at the pivot impaired the seating relation between the valve closure and the seat itself. Moreover, there was no satisfactory way to insure complete sealing around the entire valve seat because if the valve closure and seat were pressed together the alignment between the two might be changed. As a consequence, flap-type valve assemblies hinged like doors were frequently confined to operations where they acted, for example, as a chimney valve, rather than being used in situations where complete sealing was most desirable.

In the valve assembly of this invention the various difficulties connected with the prior usage of flap-type valves have been overcome. Not only is this new valve assembly a relatively less expensive construction but it is also highly efficient and advantageous in reversing the flow of gaseous fluids in reversing metallurgical furnaces or similar situations were complete sealing is desired. Such complete sealing can be obtained with this invention even though some of the parts of the valve assembly should warp or move out of line in the course of the use thereof in service. One feature of this new valve further is that the pivotal mounting thereof is not critical when compared to the prior practice. Another feature of the new valve assembly permits a single valve closure assembly to alternate between two valve seats respectively sealing the opening defined by each of those seats. Further, since the construction of this new valve assembly is not complicated, repairs and maintenance are kept down to the very minimum. In addition, unlike many other such valves put into service of this nature, the present valve assembly requires no special housing or additional plant space. Instead, it can be constructed substantially within the same space required for the reversing conduits in the furnace in which it may be installed.

Other objects and advantages of this invention will be apparent from the following description and from the following drawings, which are illustrative only, in which Figure 1 is a schematic view of an installation of a valve made in accordance with this invention for use on an open-hearth furnace;

Figure 2 is an enlarged view of the valve assembly of this invention shown in Figure 1 taken along line II—II of Figure 1;

Figure 3 is a view in section taken along line III—III of Figure 2;

Figure 4 is a view of one side of the valve closure assembly illustrated in the embodiment shown in Figures 1 to 3;

Figure 5 is a view in section taken along line V—V of Figure 4;

Figure 6 is an enlarged view similar to Figure 5 showing the central portion thereof;

Figure 7 is an illustration of one means for obtaining positive movement of the valve closure in the valve assembly of this invention; and Figure 8 is a detailed view of a check valve suitable for use in the arrangement shown in Figure 7.

Referring to Figure 1, there is provided an intake conduit 10 for air having therein a conventional butterfly control valve 11 for an air blower 12 powered by an electric motor 13. An air main 14 connects the outlet of the blower 12 to the inlet of a valve assembly 15 constructed in accordance with this invention. The valve assembly 15, as will be seen in Figure 1, forms with the air main 14 a T connection which is substantially equivalent in area to a plain T which would be required to connect the main 14 with the respective conduits 16 leading to the regenerators 17 for the respective ends of a furnace, such as an open-hearth furnace which is not illustrated. The conduits are provided with flanges 18 for bolting connection to flanges 19 at the respective ends of the valve assembly 15. In this way, the entire valve assembly can be removed, if it should be required, when the bolts connecting its flange 20 with main 14 are also removed. Generally, when a reversing valve installation is made, it is relatively permanent.

In the valve assembly 15 which is shown as one embodiment of this invention, a cylindrical housing 21 is provided having an opening 22 therein of a diameter equal to the diameter of the air main 14. Opening 22 is provided with a flange 20 as aforesaid for bolting engagement with a mating flange 23 on the main 14. The ends of housing 21 have projecting therethrough the short lengths of pipe 24 welded around their exteriors to the opening through the said ends of housing 21. The pipes 24 are provided with the aforesaid flanges 19 for mating engagement with the respective flanges 18 on the conduits 16. Suitable gaskets are provided between mating flanges as is well understood in this art.

The inner ends of the pipe lengths 24 are machined on the diagonal so as to provide planar valve seats 25. These seats are machined with a finish so as to engage a sealing enclosure assembly 26 in sealing relationship. As shown in Figure 1 and Figure 3 the valve closure assembly 26 alternates between the valve seats 25 to direct air entering the assembly 15 from main 14 to one side and then to the other through the respective conduits 16. It will thus be seen that the valve seats 25 define valve openings 27 and also define a V-shaped space or V-shaped groove within the confines of the cylindrical housing 21 between the valve seats 25. The apex of the aforesaid V-shaped space is opposite the opening 22 and there is a gas passage through valve assembly 15 at least as great in area as the respective passages defined by valve seats 25. A rectangular housing portion 28 having a removable cover 29 extends across the cylindrical housing 21 forming a part thereof adjacent the apex of the V-shape formed by the planes of the valve seats 25. Arcuate plates 30 close the space between cylindrical housing 21 and the edge of the valve seats 25 adjacent the apex formed by the intersection of their respective planes. Additional longitudinal stays may be provided around the exterior of each valve seat 25 between it and the adjacent end 31 of housing 21 to support such valve seats in operation. These stays may be welded in place as will readily be understood and will not project beyond valve seats 25 into the aforesaid V-shaped space.

The valve closure assembly 26 comprises a pair of valve plates 32 in rigidly spaced connected relationship. These valve plates 32 are back to back and are flexibly connected to a platelike pivotal member or arm 33. Each valve plate 32 is a planar sheet of metal such as steel of oval outline of a size sufficient to engage the entire periphery of respective valve seat 25 with which it is to cooperate. As shown in Figure 4, a series of six holes may be drilled in the valve plate 32 for bolts and nuts 34. Usually a lock washer will be used under the nut for each bolt 34. Spacing is obtained by providing, between the respective backs of the valve plates 32, spacing collars 35 which comprise lengths of pipe having an internal diameter sufficient to slip over the bolts 34 but insufficient to pass through the holes drilled in the respective plates 32 for the shanks of those bolts. This construction is more particularly shown in Figure 6. Hence, tightening the bolts will bring the backs of the valve plates 32 hard against the spacing collars 35 and produce a rigidly spaced and connected pair of valve plate 32 as shown in Figures 3, 5 and 6. The bolts 34 which pass through retainer plates 36 and the spacers 35 associated therewith are longer as also shown in Figure 6 to accommodate the thickness of those retainer plates. Retainer plates 36 in turn are bolted to the outer surface or face of the valve plates 32. An annular valve gasket 37 is provided around the rim of each valve plate 32 on the front thereof for continuous contact engagement with the respective valve seat 25, thereby during such engagement completely shutting off or sealing the valve opening 27 defined by that valve seat from receiving any air issuing from main 14 and passing through opening 22. Each gasket 37 may be made of rubber, where the service operating conditions permit, or other preferably elastic material of a suitable nature. These gaskets can be affixed, for example, to the respective valve plates 32 by a suitable adhesive.

The pivotal member 33 for rigidity and strength may be constructed of a plate of steel 38. Strengthening flanges 39 may be welded to the edges thereof extending toward the valve plates 32 from a shaft 40. The outer ends of the flanges 39 are drilled so that shaft 40 may be passed therethrough and fastened thereto. The lower edge of the plate 38 is welded along the shaft with the result that as the shaft 40 is turned the platelike member 33 pivots about the axis of that shaft 40. Plate 38 is drilled for the passage of the bolts 34 and their spacing collars 35 as shown in Figures 3, 5 and 6. The holes 41 so drilled near the top of plate 38 for the passage of the bolts 34 and spacing collars 35 associated with the retainer plates 36 are larger than the outside diameter of the spacing collars 35 but smaller than the outside diameter of the springs 42. The lower pair of holes 43 through plate 38 are similarly larger than the outside diameter of the spacing collars 35 passing therethrough. In this way, there is no relative movement possible between the respective valve plates 32 but these two valve plates do have limited universal movement relative to the pivotal arm 33. The retainer plates 36 are recessed at 44 thereby providing guiding sockets for the outer ends of the springs 42. In this manner the valve plates 32 are flexibly or resiliently connected to pivotal member 33 and have limited universal or angular movement possible relative thereto.

As valve closure 26 is pivoted about the axis of shaft 40 first in one direction and then in the other, it will be seen that the nearer valve plate 32 will engage its valve seat 25 and that subsequently the other valve plate 32 will engage the other valve seat 25. Because of the limited universal movement possible between the valve plate assembly and the pivotal member 33, the valve plates are self-adjusting during seating relative to their respective valve seats 25. Thereby, the location of the axis of shaft adjacent the apex of the V-shaped space between the valve seat 25 is not critical for sealing relationship between the valve plates 32 and their respective valve seats 25. Moreover, if the pivotal arm 33 is moved through an arc slightly greater than the dihedral angle between the planes of the valve seats 25, the springs will be compressed to exert sealing pressure on each valve plate 32 in turn to bring it into very firm contact with its valve seat 25. The springs also separately deflect under such pressure and the slight angular twisting which occurs. Thus, the valve plates 32 line up perfectly against the valve seats 25 during this increment of motion of the arm 33 toward a valve seat 25 beyond a closure position of arm 33 about parallel to such valve seat. Thereby, the pivotal member 33 in closing either valve opening 27 does not have to be precisely parallel to the plane of the respective valve seat with which it is to be in such closing relationship. It may further be noted that in its movement about the axis of shaft 40, valve closure 26 takes up relatively little space beyond that which would be taken up by a plain T connection for the respective conduits 16.

Shaft 40 is mounted in a pair of pillow blocks 45 fastened to one side of the housing extension 28. Collars 46 are fixed on the shaft 40 inwardly of the pillow blocks to prevent endwise movement of the shaft 40. One end of shaft 40 to the right as viewed in Figure 4 extends through a stuffing box 47 thereby maintaining the seal between the interior and the exterior of the housing 21. The outer end of shaft 40 outside housing 21 is keyed to a lever 48. The other end of lever 48 is pivotally connected to a clevis 49 fastened to the exterior end of a plunger 50. Plunger 50 is adapted to reciprocate in a conventional double-acting fluid cylinder 51. Fluid cylinder 51 is pivotally suspended by a clevis 52 at its other end to a bracket 53 fastened or welded to the exterior of housing 21. Bracket 53 may also serve, for example, as a platform for a conventional electrically operated valve 54. Valve 54 controls the delivery and exhaust of the fluid such as compressed air used to operate cylinder 51 through the pipes 55 and 56. A modified check valve 57 and 58 may be included respectively in pipes 55 and 56 between them and the ports of valve 54.

In Figure 8 there is a cross section of a valve which may be employed as check valves 57 and 58. In the valve shown in Figure 8, no claim to which is made in this case, there is provided a lift 59 of a conventional type through which a small opening 60 is axially drilled. The composition disc 61 in the lift 59 presses against a valve seat 62 during the exhaust or relief of the respective end of cylinder 51. Since in this check valve the tapped end 63 is toward the cylinder 51 while the tapped end 64 is toward the valve 54, it will be seen that during such relief there is a bleed to exhaust through valve 54 through the opening 60. On the other hand, when valve 54 is admitting air into the respective end of cylinder 51 the entire lift 59 rises in the respective check valve. This arrangement cushions the movements of plunger 50 in the cylinder 51 in the course of its swinging lever 48 through the arc A in the course of reversing the flow of air entering the valve assembly 15 from air main 14.

It may be noted that the arc A through which arm 48 rocks should be slightly greater in angular degrees than the angle B which is equal to the angle C between the planes defined by the respective valve seats 25 within housing 21. When so done, the pivotal member 33 will not only close the respective opening 27 but, in addition, will press the valve plate 32 concerned tightly against its valve seat 25. The adjustment between such valve plate and valve seat will not be disturbed because of the limited angular movement and adjustment that can take place because of the resilient mounting between the valve plates and the pivotal member 33. Should it be necessary or desirable to inspect or remove the valve closure assembly 26 or any part thereof, such may readily be done after removing the plate 29 from the housing extension 28.

Although this invention has been described in relation to one form of air reversing valve for open-hearth furnaces or the like, it will be evident that the principles thereof are susceptible of many uses and changes without departing from this invention. Thus, the valve closure assembly may readily be adapted to use with a single valve seat such as are found in some chimney valve installations. Further, this invention may be applied to valves for gas mains and various types of large exhaust or inlet valves. In some cases, provision may be made for the water cooling of parts, such as the valve plates, of the valve assemblies made in accordance with this invention. These and other modifications are considered within the scope of this invention as defined by the appended claims.

I claim:

1. In a valve assembly for gas conduits or the like, in combination, a pair of generally planar valve seats defining a V-shaped space therebetween, a valve plate for each of said valve seats, said valve plates being rigidly connected in back-to-back relation at a number of positions over the area of said valve plates, a pivotal member extending between the respective backs of said valve plates to move them into respective engagement with said valve seats, said connections between said valve plates passing through openings in said pivotal member of a diameter sufficient to permit limited angular movement therebetween, and separating means between said pivotal member and said valve plates, whereby each valve plate may adjust itself relative to and press against its valve seat when brought into engagement therewith by said pivotal member.

2. In a valve assembly for gas conduits or the like, in combination, a pair of generally planar valve seats defining a V-shaped space therebetween, a valve plate for each of said valve seats in back-to-back relation within said V-shaped space, spacers extending between the respective backs of said valve plates rigidly connecting and spacing the same, a pivotal platelike member extending between the respective backs of said valve plates to move them into respective engagement with said valve seats, said pivotal platelike member being loosely connected to said valve plates at a plurality of positions, and at least one resilient member extending between the back of each valve plate and said pivotal platelike member tending to separate them, whereby each valve plate may adjust itself relative to and press against its valve seat when brought into engagement therewith by said pivotal platelike member.

3. In a valve assembly for gas conduits or the like, in combination, a pair of generally planar valve seats defining a V-shaped space therebetween, a valve plate for each of said valve seats in back-to-back relation within said V-shaped space, spacers extending between the respective backs of said valve plates rigidly connecting and spacing the same, a pivotal platelike member extending between the respective backs of said valve plates to move them into respective engagement with said valve seats, said pivotal platelike member being loosely connected around at least some of said spacers to said valve plates at a plurality of positions, at least one springlike member extending between the back of each valve plate and said pivotal platelike member tending to separate them, and means for moving said pivotal platelike member through an angle symmetrical with but slightly greater than the angle defined by the V-shaped angle between said valve seats, whereby each valve plate may adjust itself relative to and press against its valve seat when brought into engagement therewith by said pivotal platelike member.

4. In a valve assembly for gas conduits or the like, in combination, a pair of planar valve seats in respectively angular relation, a valve closure of oval configuration for each of said valve seats adapted to respectively engage the same, said valve closures being relatively rigid planar members, a plurality of elements rigidly connecting said valve closures to each other back to back at a plurality of points, a pivotal member loosely receiving a sufficient number of said elements to prevent relative rotation of said valve closures, said pivotal member extending between and loosely connected with said valve closures to move them relative to said valve seats respectively, said pivotal member being spaced a limited distance from said valve closures on a line perpendicular to the plane of the closures, said pivotal movement having its axis of rotation generally aligned in the apex of the angular space between the valve seats, a flexible connection between said pivotal member and said valve closures, said flexible connection tending to separate said pivotal member from while providing for limited universal movement between said pivotal member and said valve closures, whereby said valve closures will adjust themselves relative to whichever of said valve seats they may be caused to engage respectively, and positive actuating means moving said pivotal member through an arc sufficient to move the valve closure an angular distance slightly greater than the angular distance between the valve seats and set it on one of said seats with a substantially constant pressure.

References Cited in the file of this patent

UNITED STATES PATENTS

| | | |
|---|---|---|
| 98,322 | Warren | Dec. 28, 1869 |
| 260,490 | Martin | July 4, 1882 |
| 589,650 | Giles | Sept. 7, 1897 |
| 787,565 | Coryell | Apr. 18, 1905 |
| 1,072,998 | Shaw | Sept. 9, 1913 |
| 1,581,595 | Osborne | Apr. 20, 1926 |
| 1,858,246 | Mahan | May 17, 1932 |
| 2,035,747 | Harris | Mar. 31, 1936 |
| 2,158,309 | Salisbury | May 16, 1939 |
| 2,292,906 | Specht | Aug. 11, 1942 |
| 2,312,290 | Smith | Feb. 3, 1943 |